United States Patent
Kato et al.

(10) Patent No.: US 12,249,852 B2
(45) Date of Patent: Mar. 11, 2025

(54) CART GATE

(71) Applicant: TOSHIBA TEC KABUSHIKI KAISHA, Tokyo (JP)

(72) Inventors: Masakazu Kato, Numazu Shizuoka (JP); Sadatoshi Oishi, Fuji Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 733 days.

(21) Appl. No.: 17/363,709

(22) Filed: Jun. 30, 2021

(65) Prior Publication Data
US 2022/0166263 A1 May 26, 2022

(30) Foreign Application Priority Data
Nov. 24, 2020 (JP) ................. 2020-194466

(51) Int. Cl.
*H02J 50/90* (2016.01)
*B62B 3/14* (2006.01)
(Continued)

(52) U.S. Cl.
CPC ............ *H02J 50/90* (2016.02); *B62B 3/1404* (2013.01); *H02J 7/0047* (2013.01); *H02J 50/12* (2016.02); *H02J 50/40* (2016.02)

(58) Field of Classification Search
CPC .......... H02J 50/90; H02J 7/0047; H02J 50/12; H02J 50/40; H02J 7/0042; H02J 50/005;
(Continued)

(56) References Cited

U.S. PATENT DOCUMENTS 5,610,584 A * 3/1997 Schrade ................. A47F 9/045
340/556
6,525,510 B1 2/2003 Ayano et al.
(Continued)

FOREIGN PATENT DOCUMENTS

JP 2003061266 A 2/2003
JP 2006101577 A 4/2006
(Continued)

OTHER PUBLICATIONS

Japanese Office Action dated Aug. 13, 2024, mailed in counterpart Japanese Application No. 2020-194466, 12 pages (with translation).

*Primary Examiner* — Jack Chiang
*Assistant Examiner* — Brandon Bowers
(74) *Attorney, Agent, or Firm* — Kim & Stewart LLP

(57) ABSTRACT

According to an embodiment, a cart gate for storage of carts that have a power reception device includes a pair of guides spaced from each other in a cart-width direction. The guides extend along a forward cart direction. A power transmission device is mounted on a portion of one of the guides. The power transmission device is configured to provide power, in a non-contact manner, to a power reception device on a cart that is between the pair of guides and at a predetermined cart storage position along the forward cart direction. The minimum distance between the guides in the cart-width direction is greater than a width of the cart, but the difference between the minimum distance and the width of the cart is less than or equal to a power transmitting range of the power transmission device.

10 Claims, 13 Drawing Sheets

(51) Int. Cl.
*H02J 7/00* (2006.01)
*H02J 50/12* (2016.01)
*H02J 50/40* (2016.01)

(58) Field of Classification Search
CPC ...... H02J 50/10; B62B 3/1404; B62B 3/1424; B62B 5/00
See application file for complete search history.

(56) References Cited

U.S. PATENT DOCUMENTS

| | | | |
|---|---|---|---|
| 11,142,086 B2 | 10/2021 | Tanaka | |
| 11,283,299 B2* | 3/2022 | Kato | B60L 53/30 |
| 11,590,997 B1* | 2/2023 | Bhaskaran | B62B 5/0069 |
| 2016/0322851 A1* | 11/2016 | Yeh | H04B 5/0037 |
| 2018/0222514 A1* | 8/2018 | Jones | B62B 3/1404 |
| 2019/0207427 A1* | 7/2019 | McNeally | H02J 7/35 |
| 2019/0291764 A1* | 9/2019 | Heiman | B62B 5/00 |
| 2020/0122762 A1* | 4/2020 | Kato | H02J 50/40 |
| 2020/0127498 A1* | 4/2020 | Kato | H02J 7/0042 |
| 2020/0127505 A1* | 4/2020 | Kato | B62B 3/1404 |
| 2020/0298898 A1* | 9/2020 | Ogishima | H02J 50/40 |
| 2020/0303953 A1* | 9/2020 | Oishi | H04B 5/0087 |
| 2021/0075260 A1* | 3/2021 | Kato | H02J 50/90 |

FOREIGN PATENT DOCUMENTS

| | | |
|---|---|---|
| JP | 2020018069 A | 1/2020 |
| JP | 2020066270 A | 4/2020 |
| JP | 2020068553 A | 4/2020 |
| JP | 2020156258 A | 9/2020 |

\* cited by examiner

CART GATE

CROSS-REFERENCE TO RELATED APPLICATIONS

This application is based upon and claims the benefit of priority from Japanese Patent Application No. 2020-194466, filed Nov. 24, 2020, the entire contents of which are incorporated herein by reference.

FIELD

Embodiments described herein relate to generally to a cart gate.

BACKGROUND

In recent years, systems have been devised that provide various services by mounting electronic devices on a cart such as a shopping cart that can be operated by a user. In such a cart, a battery for supplying electric power is also mounted on the cart. As a charging system for a cart-mounted battery, a non-contact power transmission technology for supplying power to the cart when the cart is stored in a storage position has been adopted. For a power supply system, a cart can be provided with a power reception coil to receive power in a non-contact manner from a power transmission coil located at the cart's storage position. For example, there is a power supply device that can be used with a cart with a power reception coil is positioned on below a front end portion of the cart that has a power transmission coil provided on the floor at the cart's storage position. There is also power supply device configuration for a power reception coil that is provided on a side of the cart. The power transmission coil in this case must be disposed to face the power reception coil on the cart's side surface, so the power transmission coil has to stand upright rather than flat on the floor. For non-contact power transmission, in order to efficiently transmit power, it is important to align the antenna on a power reception side to the antenna on a power transmission side. To align the antennas, a guide rail for the wheels of the cart can be arranged on the floor to correctly position the cart with respect to the power transmission coil.

DETAILED DESCRIPTION

In general, according to one embodiment, a cart gate for storage of carts having a power reception device includes a pair of guides spaced from each other in a cart-width direction. These guides extend along a forward cart direction. A power transmission device is mounted on a portion of one of the guides. The power transmission device is configured to provide power, in a non-contact manner, to a power reception device on a cart that is located between the pair of guides at a predetermined cart storage position along the forward cart direction. The minimum distance between the guides in the cart-width direction is greater than a width of the cart, but the difference between the minimum distance and the width of the cart is less than or equal to a power transmitting range of the power transmission device.

Figure 1:
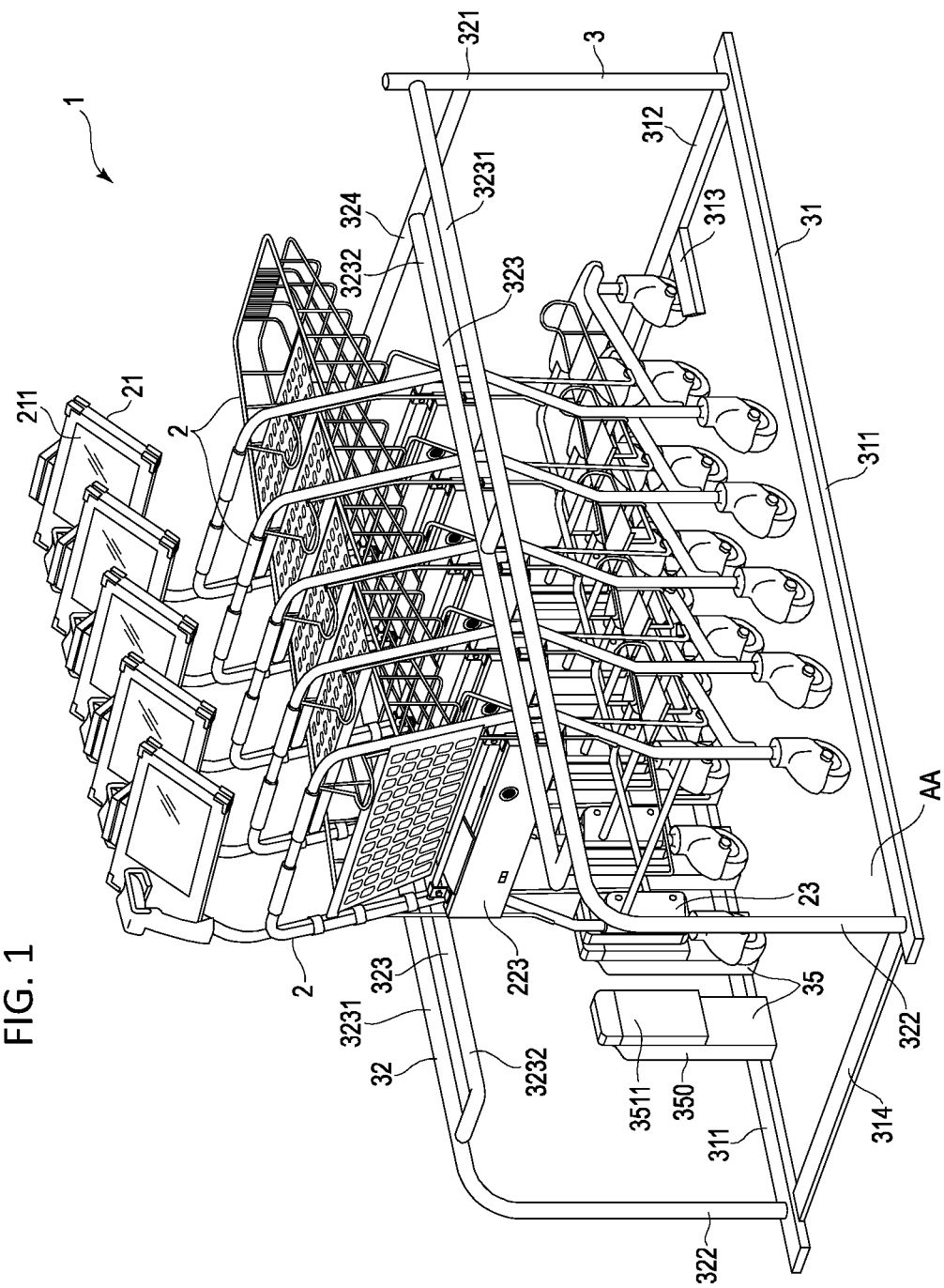
FIG. 1 is a perspective view illustrating a configuration of a power supply system according to a first embodiment.
Figure 2:
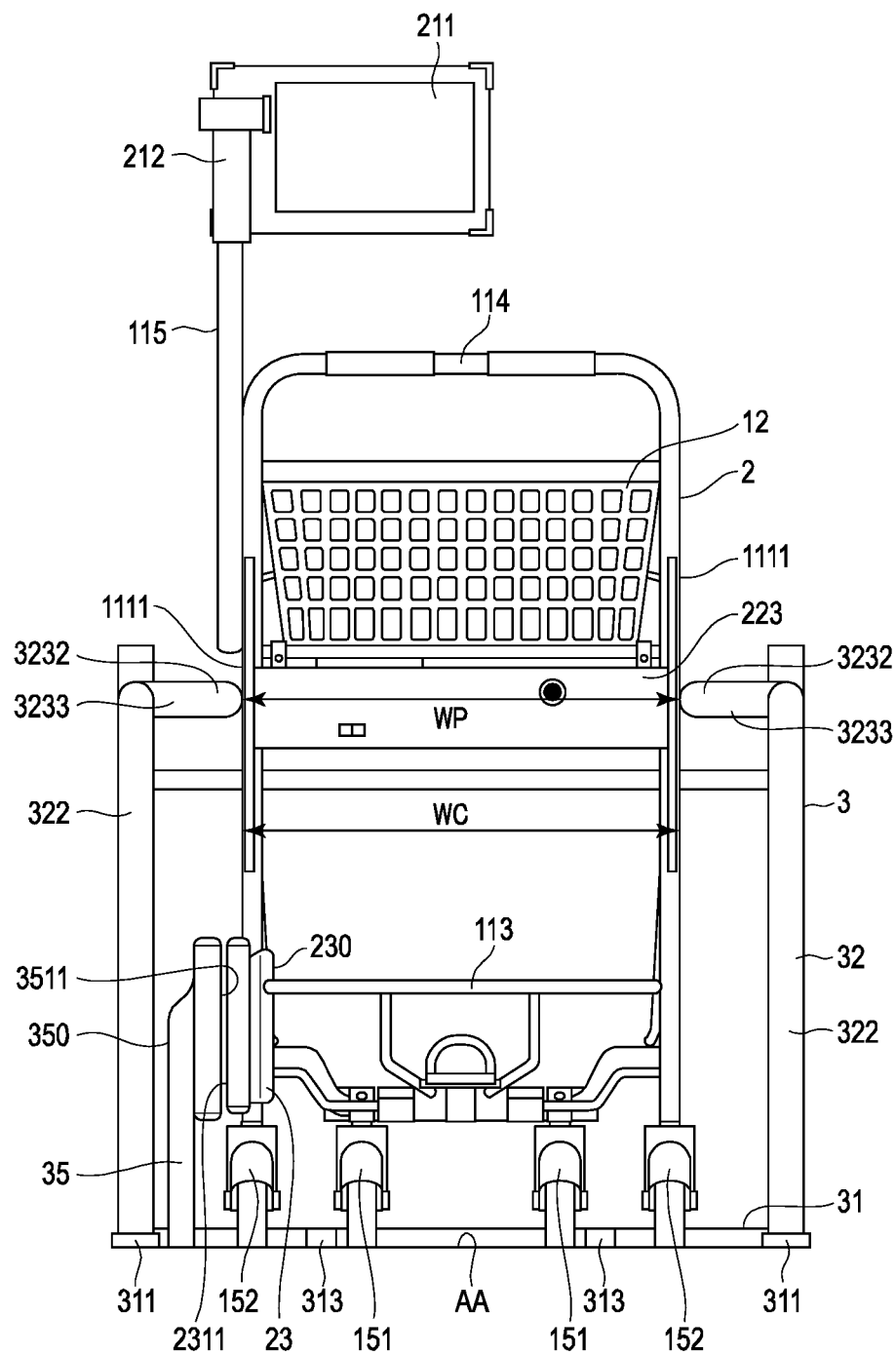
FIG. 2 is a rear view illustrating a configuration of a power supply system.
Figure 3:
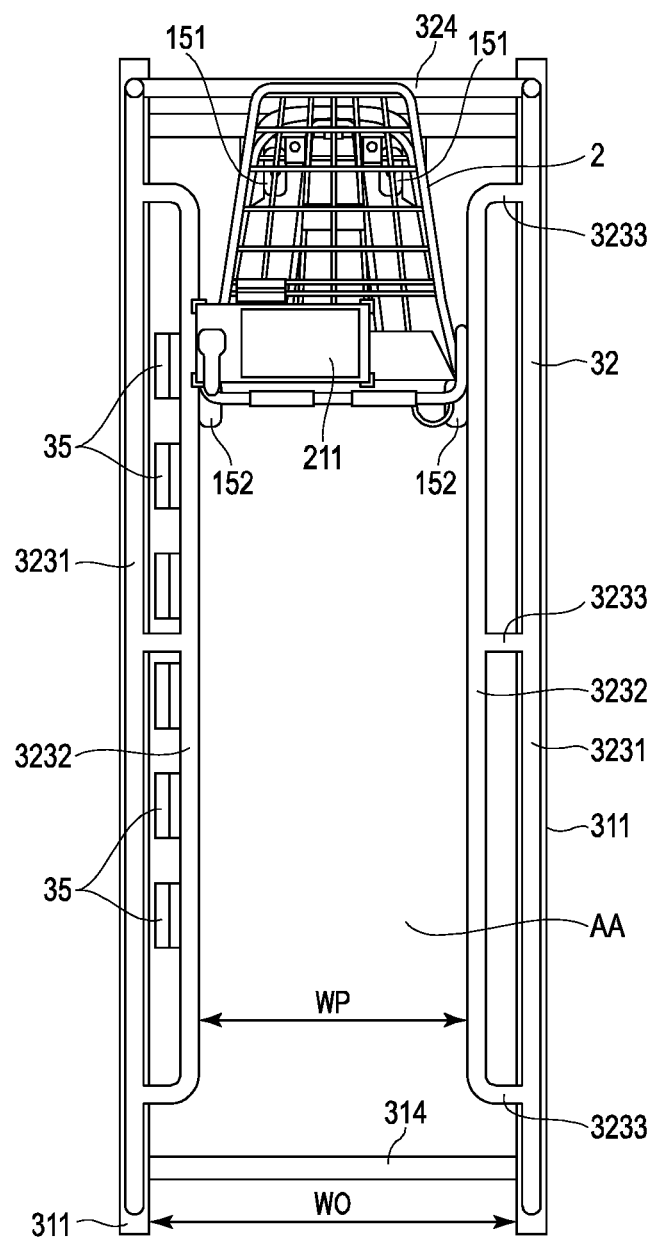
FIG. 3 is a top view illustrating a configuration of a power supply system.
Figure 4:
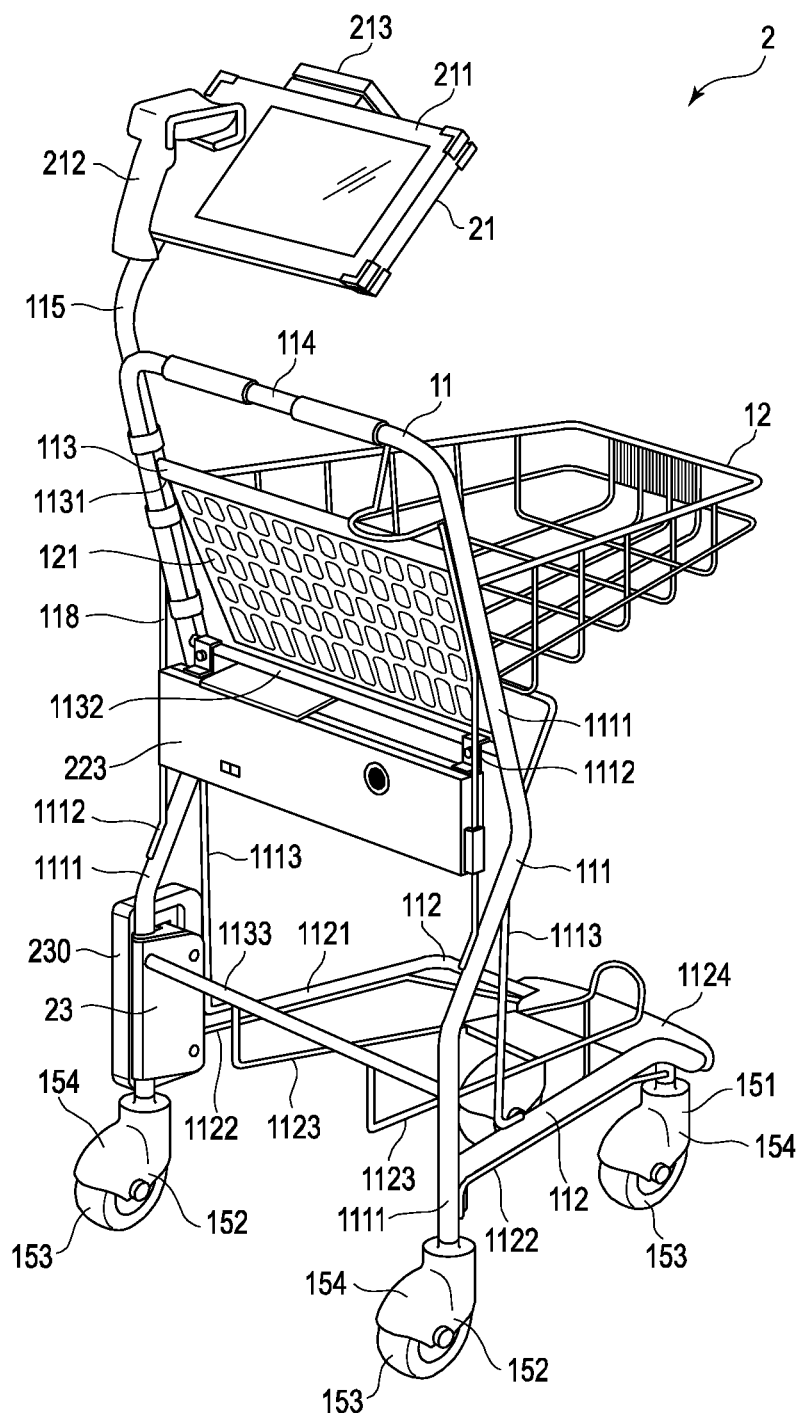
FIG. 4 is a perspective view illustrating a configuration of a cart of a power supply system.
Figure 5:
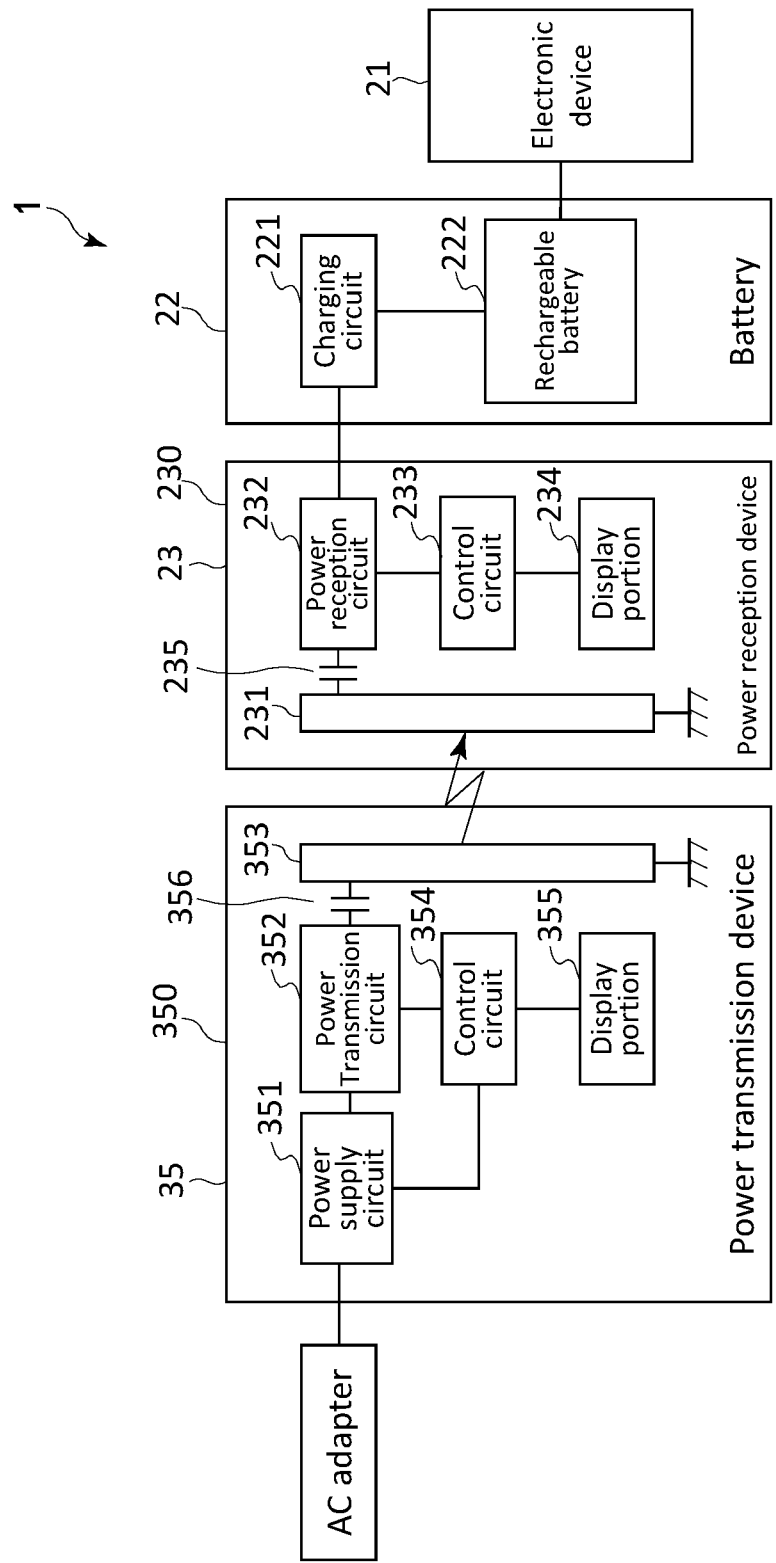
FIG. 5 is a block diagram illustrating a configuration of a control system of a power supply system.

A power supply system 1 according to a first embodiment will be described with reference to FIGS. 1 to 5. FIG. 1 is a perspective view showing a configuration of the power supply system 1, FIG. 2 is a rear view of the power supply system 1 viewed from the rear side, and FIG. 3 is an upper surface view. FIG. 4 is a perspective view showing the configuration of the cart 2, and FIG. 5 is a block diagram showing the configuration of a control system of the power supply system 1.

For purposes of description of this embodiment, the front-rear direction of the cart 2 may be referred to as a first direction, the width direction of the cart 2 may be referred to as a second direction, and the up-down direction may be referred to as a third direction.

The power supply system 1 includes a cart 2 that has a power reception device 23, and a cart gate 3 into which the cart 2 can be placed. The cart gate 3 includes a power transmission device 35. The cart gate 3 can include a plurality of power transmission devices 35 arranged in the first direction, so a plurality of carts 2 (each including a power reception device 23) can be arranged along the first direction for storage with the plurality of power transmission devices 35 being arranged to face the power reception devices 23 in the different carts 2 at a predetermined interval. Cart gate 3 may be referred to as a storage rack, a cart rack, or a cart storage rack in some instances.

As shown in FIG. 4, the cart 2 is a movable body, for example, a shopping cart. The cart 2 includes a frame 11, a basket portion 12, casters 151, casters 152, an electronic device 21, a battery box 223 (in which a battery 22 is provided), and a power reception device 23.

The frame 11 is formed by assembling a plurality of frame members extending in different directions. The frame 11 can support the basket portion 12, the casters 151 and 152, electronic devices 21, and the power reception device 23 at various positions.

The frame 11 includes a pair of left and right vertical frame portions 111, a lower frame portion 112, a horizontal frame portion 113, a handle portion 114, and a mounting frame 115. The vertical frame portion 111, the lower frame portion 112, and the horizontal frame portion 113 intersect each other.

The vertical frame portion 111 includes a pair of main frames 1111 extending upward from the rear wheel casters 152, a pair of sub frames 1112 provided on the rear side of the main frames 1111, and a pair of sub frames 1113 provided on the front side of the main frames 1111. The vertical frame portion 111 extends in the vertical direction at the rear of the basket portion 12, and the rear wheel casters 152 are disposed at a lower end portion of the vertical frame portion 111.

The main frame 1111 may be bent at certain points. The sub frames 1112 and 1113 are fixed to the main frame 1111. The sub frame 1112 extends in the vertical direction, and connects bent portions of the main frame 1111. The sub frame 1113 extends in the vertical direction. The upper end of the sub frame 1113 is connected to the front side of the main frame 1111, and the lower end of the sub frame 1113 is connected to the upper side of the main frame 1121.

The lower frame portion 112 includes a plurality of frame members arranged roughly parallel to the floor surface on which the cart 2 moves. The lower frame portion 112 includes, for example, a pair of main frames 1121, a pair of sub frames 1122, a support frame 1123, and a front coupling portion 1124. The main frame 1121 extends forward from the rear wheel caster 152 toward a front wheel caster 151. The sub frames 1122 are disposed under the main frames 1121. The support frame 1123 constitutes a basket receptacle along the floor surface inside the main frame 1121. The front coupling portion 1124 is at the front end portion of the lower end of the cart 2 and extends in the width direction to connect the front ends of the pair of main frames 1121.

The horizontal frame portion 113 includes link frames 1131, 1132, and 1133 extending in the width direction between the left and right vertical frame portions 111.

The handle portion 114 is disposed at the rear end portion of the cart 2. The handle portion 114 is continuous with the upper end portion of the vertical frame portion 111. As an example, the handle portion 114 extends in the width direction.

The mounting frame 115 is connected to the vertical frame portion 111. For example, the mounting frame 115 extends above one of the vertical frame portions 111 and supports one or more electronic devices 21.

In the frame 11, a basket portion 12 is supported by the vertical frame part 111, and the front wheel casters 151 and the rear wheel casters 152 are respectively provided at a front end part and a rear end part of the lower frame part 112 below the basket portion 12.

In the frame 11, the power reception device 23 is provided at a corner formed by the lower end portion of the vertical frame portion 111 and the rear end portion of the lower frame portion 112. A battery box 223 is provided on the vertical frame portion 111. For example, the battery box 223 is supported by the pair of sub frames 1112 of the vertical frame portion 111.

The pair of main frames 1121 and the pair of sub frames 1122 extend at an angle toward the centerline of cart 2 so that the interval towards the front side of cart 2 becomes narrower. The frame 11 has a narrower width at the front and at the rear of the cart 2. In this context, front and rear refer to the normal forward movement direction (advancing direction) of the cart 2 when pushed by a user using handle 114.

The basket portion 12 is formed of, for example, a perforated panel or a mesh-like wire in a box shape that opens upward. The basket portion 12 constitutes a storage portion in which various commodities can be placed. In some examples, basket portion 12 may support a separable, hand carriable shopping basket for storing the commodities. The left and right sides of a rear end portion of the basket portion 12 are supported by the vertical frame portion 111.

The basket portion 12 is narrower at the front side than at the rear side of the cart 2. The basket portion 12 is supported by the left and right main frames 1111 and the link frame 1131 between the main frames 1111. The basket portion 12 has an opening/closing panel 121 which swings open and closed. The opening/closing panel 121 has its lower end as a free end, and the upper end is configured to be openable and closable on a hinge or a pivot point.

Each front wheel caster 151 and rear wheel caster 152 includes a wheel 153 that rotates within a bracket portion 154 that supports the wheel 153. The bracket portion 154 is rotatably attached to the frame 11 to permit the wheels to point in different directions. The cart 2 moves on the wheels 153 along the floor surface.

Corresponding to the shapes of the frame 11 and the basket portion 12, the interval between the front wheel casters 151 is less than the interval between the rear wheel casters 152. Therefore, when a plurality of carts 2 are stored in series along the front-rear direction, each cart 2 can be stored such that the frame 11 of the cart 2 behind overlaps the frame 11 of the cart 2 in front. When the carts 2 are stacked in the front-rear direction, the front end of the basket portion 12 of the rearward cart 2 pushes the opening/closing panel 121 of the frontward cart 2 forward and open. In addition, when a plurality of carts 2 are arranged in a stacked manner, the frames 11 of adjacent carts 2 engage with each other while maintaining a predetermined positional relationship, and the power reception devices 23 can be positioned and arranged at a constant pitch to correspond to the positional relationship of the stacked carts 2.

The electronic device 21 is an information terminal such as a tablet terminal for providing information to a user and/or a commodity reader for acquiring information from a commodity selected by the user. The electronic device 21 is connected to, battery 22, and the electronic device 21 is driven with electric power from the battery 22. In some examples, the electronic device 21 may be a charging device for charging another electronic device such as a portable terminal carried by a cart 2 user (for example, a mobile phone, a smartphone, a digital camera, or the like) with electric power from the battery 22.

In the first embodiment, a tablet terminal 211 and a commodity reader 212 are provided as electronic devices 21. The tablet terminal 211 is a computer including a display screen provided with a touch panel. The tablet terminal 211 is installed with the display portion facing towards a user positioned on the handle portion 114 side of the cart 2. For example, the tablet terminal 211 displays information about a commodity for which a barcode, a RFID tag, or the like has been scanned by the commodity reader 212. In addition, the tablet terminal 211 may perform settlement processing based on the commodities scanned by the commodity reader 212.

The commodity reader 212 is a device that reads information about a commodity. The commodity reader 212 may include a display portion that displays information about the scanned commodity. For example, the commodity reader 212 is an RFID tag reader, or the like that reads an RFID attached to a commodity placed into the basket portion 12. The commodity reader 212 may be a barcode scanner or the like that reads commodity identification information such as a barcode on a commodity.

In some examples, the electronic device 21 may be an interface device permitting the connecting of a portable terminal (e.g., a smartphone, a tablet terminal, or the like) carried by a user instead of the tablet terminal 211. A portable terminal connected to the electronic device 21 functioning as an interface device may perform processing similar to that of the tablet terminal 211 described above. The electronic device 21 functioning as an interface device may charge a battery of the portable terminal. The electronic device 21 may itself incorporate the battery 22, or may be connected to the battery 22 which is provided separately.

The battery box 223 is provided on the frame 11. The battery box 223 is fixed to and supported by, for example, a pair of sub frames 1112 disposed below the opening/closing panel 121 of the basket portion 12. The battery 22 is a power supply device that supplies power to the electronic device(s) 21 mounted on the cart 2, and includes a charging circuit 221 and a rechargeable battery 222. The battery 22 is connected to the power reception device 23 and is charged with power supplied by the power reception device 23.

The charging circuit 221 supplies electric power from the power reception circuit 232 of the power reception device 23 to the rechargeable battery 222. For example, the charging circuit 221 converts the power supplied from the power reception circuit 232 into a direct current (DC) that can be used for charging the rechargeable battery 222. That is, the charging circuit 221 converts the generally alternating current (AC) power received from the power reception circuit 232 into DC charging electric power having a predetermined current value and voltage value for charging the rechargeable battery 222. The charging circuit 221 supplies the DC electric power to the rechargeable battery 222. The charging circuit 221 thus charges the rechargeable battery 222 with the power from the power reception device 23.

The rechargeable battery 222 supplies power to the electronic device(s) 21. The battery 22 may be provided separately from an electronic device 21 or internal thereto.

As shown in FIG. 5, the power reception device 23 includes a casing 230, a power reception coil 231, a power reception circuit 232, a control circuit 233, and a display portion 234. For example, in the power reception device 23, the power reception coil 231 and a circuit board are disposed in the casing 230, and various processing circuits including the power reception circuit 232 and the control circuit 233 are mounted or otherwise provided on the circuit board.

The power reception device 23 is located on a side of the cart 2 at a corner part formed by the lower end of the vertical frame portion 111 and the rear end of the lower frame portion 112. The power reception device 23 is provided above the rear wheel caster 152. The power reception device 23 is disposed such that the power reception surface 2311 of the power reception coil 231 is perpendicular or substantially perpendicular to the floor surface on which the cart 2 is supported. The power reception device 23 is sized such that when a plurality of carts 2 are stacked and stored in a row, the power reception devices 23 of adjacent carts do not contact each other.

The casing 230 accommodates the power reception coil 231 on a circuit board along with various circuits. The casing 230 includes a holding portion that holds the frame 11, and is held by the frame 11.

The power reception coil 231 is inside casing 230. For example, the power reception coil 231 may be configured as a winding structure in which an insulated wire is wound in a coil shape, or may be configured as a coil pattern formed on a printed circuit board. In the power reception coil 231, a power reception surface 2311 is formed in a planar shape. The power reception surface 2311 of the power reception coil 231 is disposed facing outward from the side of the frame 11 and is perpendicular to the floor surface.

The power reception coil 231 supplies power (AC power) to the power reception circuit 232. Specifically, the power reception coil 231 receives power transmitted from a power transmission coil 353 and supplies this received power to the power reception circuit 232.

The power reception coil 231 is connected in series or in parallel with a resonance capacitor 235 for power reception, thereby constituting a power reception resonance circuit. When the power reception coil 231 of the power reception resonance circuit approaches the power transmission coil 353 of the power transmission device 35, the power reception coil 231 is electromagnetically coupled to the power transmission coil 353. In the power reception coil 231, an induced current is generated by the magnetic field output from the power transmission coil 353. In other words, the power reception coil 231 functions as an alternating current power source when receiving alternating current power from the power transmission device 35. When the magnetic field resonance method is used for power transmission, the self-resonance frequency of the power reception resonance circuit with the power reception coil 231 is designed to be substantially the same as the frequency at which the power transmission device 35 transmits power. Therefore, the power transmission efficiency is improved when the power reception coil 231 and the power transmission coil 353 are electromagnetically coupled to each other.

The power reception circuit 232 converts the received power supplied from the power reception coil 231 into power that can be supplied to the battery 22 or directly to the electronic device 21. For example, the power reception circuit 232 rectifies power supplied from the power reception coil 231 and converts to direct current. The power reception circuit 232 is realized by, for example, a circuit including a rectifier bridge formed by a plurality of diodes. In this case, the pair of input terminals of the rectifier bridge would be connected to the power reception resonance circuit including the power reception coil 231 and the resonance capacitor 235. The power reception circuit 232 outputs direct current power from the pair of output terminals by full-wave rectifying the power supplied from the power reception coil 231.

The display portion 234 is a display device that displays various kinds of information. For example, the display portion 234 can be or include an indicator light indicating the state of the power reception device 23. The display portion 234 switches the display according to the control of the control circuit 233. For example, the display portion 234 is an LED that turns on and off or changes color according to the operation state of the power reception device 23. Alternatively, the display portion 234 may be a display screen that displays an operation state as a message.

The control circuit 233 controls operations of the power reception circuit 232 and the display portion 234. The control circuit 233 includes a processor and a memory. The processor executes arithmetic processing. The processor performs various processes based on, for example, a program stored in the memory and data used by the program. The memory stores a program, data used by the program, and the like. The control circuit 233 may include a microcomputer and/or an oscillation circuit. For example, the control circuit 233 switches display on the display portion 234 in accordance with the state of the power reception device 23.

The power reception device 23 receives power transmitted in a non-contact manner and supplies the received power to the electronic device 21 or the battery 22. The power reception device 23 may include an output terminal for supplying power to the electronic device 21. In this case, the battery 22 may be configured to be charged via the electronic device 21.

As shown in FIGS. 1 and 2, a cart 2 is stored in the cart gate 3 provided at a predetermined storage position. As shown in FIGS. 1 and 2, one cart 2 or several nested carts 2 can be stored in the cart gate 3. The cart gate 3 can be referred to as a cart storage device or a cart storage location in some contexts.

The cart gate 3 includes a guide base 31, a guide gate 32, and a plurality of power transmission devices 35.

The guide base 31 is laid on the floor. The guide base 31 comprises a pair of side frames 311, a front frame 312, a front wheel guide 313, and a rear frame 314. The side frame 311 extends in the first direction and guides wheels along the first direction. One side frame 311 positions a plurality of power transmission devices at equal intervals in the first direction. A dimension WO between the pair of side frames 311 is larger than the width of the lower end of the cart 2. The front frame 312 extends in the second direction, and both ends thereof are connected to front end portions of the pair of side frames 311. The front frame 312 regulates the position of a front wheel caster 151 of the leading cart 2 in the first direction and sets the front end position of the leading cart 2 (and thus also the front end positions of subsequent, fully nested carts 2 in a stack). The front wheel guide 313 is a rail member extending rearward from the front frame 312, and serves to regulate the position of the wheel 153 of the front wheel casters 151 of the cart 2 at the frontmost portion of the cart gate 3 in the left-right direction. The front wheel guides 313 are positioned to match the width in the first direction of the wheels 153 of a front wheel caster 151. The front wheel guide 313 has a tapered portion by which the wheel entrance side is angles outward in the second direction to better accept the wheel 153. A pair of front wheel guides 313 can be disposed slightly to be slightly wider than the wheels 153. The rear frame 314 extends in the second direction and connects the pair of side frames 311. The rear frame 314 is lower in height than the side frames 311 and the front frame 312. The rear frame 314 can be made of a thin material with a thickness that does not interfere with travel of the carts 2.

The guide gate 32 portion of cart gate 3 has a pair of front poles 321 at the ends of the front portion of the guide base 31, a pair of rear poles 322 at the ends of the rear portion of the guide base 31. Side bars 323 of the guide gate 32 are disposed on both sides of the guide base 31, and a front bar 324 is disposed at the front portion of the guide base 31. Each of the front poles 321, the rear poles 322, and the side bars 323 can be made of a hollow pipe-like material or a solid bar or rod material. In the first embodiment, the front poles 321 and the rear poles 322 are provided at both ends of each of the side frames 311. The side frames 311 extend to a predetermined height from the floor surface and the side bars 323 on the side frames 311 are at a height corresponding to a portion of cart 2 approximately half of the total height of the cart 2. The side frames 311 may be referred to as guide rails or the like.

Each of the side bars 323 includes a first side rod 3231 extending in the first direction above the side frame 311 and a second side rod 3232, supported by the first side rod 3231, extending in the first direction from the first side rod 3231. In this example, the second side rod 3232 is joined to the first side rod 3231 by a plurality of connecting members 3233. The first side rods 3231 and the second side rods 3232 extend horizontally along the traveling direction for the cart 2. In each side bar 323, the first side rod 3231, the second side rod 3232, and the plurality of connection members 3233 are integrally and continuously formed. The pair of first side rods 3231 span between and are supported by the front pole 321 and the rear pole 322. The front bar 324 spans between and is supported by the pair of front poles 321. The front bar 324 extends in the second direction. The guide gates 32 are disposed so as to face both sides of the carts 2 placed on the guide base 31, and surround the region where the carts 2 are stored.

The side bar 323 is configured such that the interval WP between the second side rods 3232 is slightly larger than the width dimension WC at the same height position of the cart 2. The side bar 323 is arranged to be at a position within the power supply range, for example, within 20 mm from the cart 2. The difference between the width dimension WC of the cart 2 and the interval WP between the second side rods 3232 is set to be less than or equal to the maximum range of the power reception device 23 and the power transmission device 35. For example, the difference between the width dimension WC and the interval WP is less than 20 mm. When there is a target value for the gap between the power reception device 23 and the power transmission device 35, the value obtained by subtracting the target value for the gap from the power supply range may be set as the maximum value of the difference between the width dimension WC 2 and the interval WP.

The power transmission devices 35 are arranged along the first direction on the side frame 311 to face the power reception device 23 of a cart 2 at a storage position in the cart gate 3. The power transmission device 35 transmits power to the power reception device 23 in a non-contact manner.

As depicted in FIG. 5, the power transmission device 35 includes a casing 350, a power supply circuit 351, a power transmission circuit 352, a power transmission coil 353, a control circuit 354, a display portion 355, and a resonance capacitor 356. For example, in the power transmission device 35, a circuit board with power transmission coil 353 is accommodated in the casing 350. Various circuits including the power supply circuit 351, the power transmission circuit 352, and the control circuit 354 are also formed on the circuit board. For example, the power transmission device 35 is disposed to be close to the power reception device 23 at a narrow gap of about 10 mm to 20 mm.

A plurality of power transmission devices 35 are arranged and positioned at a pitch at which the power reception devices 23 will be when carts 2 are stacked. The plurality of power transmission devices 35 can be disposed on the inner side of the side frame 311, but the present disclosure is not limited thereto, and the plurality of power transmission devices 35 may instead be disposed on the side frame 311 or on the outer side of the side frame 311, for example.

The power supply circuit 351 supplies direct current power to the transmission circuit 352 via, for example, an AC adapter connected to a commercial power source (e.g., an electrical wall socket). For example, the power supply circuit 351 converts a voltage of an external direct current power supply (AC adapter) to a voltage suitable for operation of other circuits including the power transmission circuit 352 the control circuit 354, and the control circuit 354.

The power transmission circuit 352 supplies power to be transmitted from the power transmission coil 353. For example, the power transmission circuit 352 generates AC power for the power transmission coil 353 by switching DC power supplied from the power supply circuit 351 under the control of the control circuit 354. The power transmission coil 353 outputs power that can be received by the power reception device 23 in accordance with the power supplied from the power transmission circuit 352.

The power transmission coil 353 can be configured as a winding structure in which an insulated electric wire is wound or as a coil pattern formed on a printed circuit board. In the power transmission coil 353, a power transmission surface 3511 for transmitting power is formed in a substantially flat (planar) shape. The power transmission surface 3511 of the power transmission coil 353 is arranged to be perpendicular to the floor surface to face the power reception surface 2311 of the power reception coil 231 in the power reception device 23. For example, power transmission coils 353 are provided at positions to be facing the power reception surfaces 2311 of the power reception coils 231 of the plurality of power reception devices 23 the stacked carts 2 at the storage position.

The power transmission coil 353 can be connected in series or in parallel with the resonance capacitor 356 to form a power transmission resonance circuit. When AC power is supplied from the power transmission circuit 352, the power transmission coil 353 in a power transmission resonance circuit generates a magnetic field corresponding to the supplied AC power.

The control circuit 354 controls operations of the power transmission circuit 352 and the display portion 355. The control circuit 354 includes a processor and a memory. The processor executes arithmetic processing. The processor performs various processes based on, for example, a program stored in the memory and data used by the program. The memory stores a program, the data used by the program, and the like. The control circuit 354 may include a microcomputer and/or an oscillation circuit.

For example, the control circuit 354 switches the display of the display portion 355 according to the state of the power transmission device 35. In addition, the control circuit 354 controls the frequency of the AC power output from the power transmission circuit 352 and controls on/off of the operation of the power transmission circuit 352. For example, the control circuit 354 controls the power transmission circuit 352 to switch between a power transmission state in which a magnetic field is generated by the power transmission coil 353 and a standby state in which a magnetic field is not generated by the power transmission coil 353. Alternatively, the control circuit 354 may control the power transmission coil 353 to intermittently generate a magnetic field and change the timing of power transmission.

The display portion 355 can be an indicator light or the like indicating the present state of the power transmission device 35. The display portion 355 switches the display indicator according to the control of the control circuit 354. For example, the display portion 355 is an LED, and switches on/off or changes display color according to the operation state of the power transmission device 35. The display portion 355 may be a liquid crystal screen and indicate an operation state by a message.

When a cart 2 is accommodated in the cart gate 3 that is configured as described above, a user grips the handle portion 114 and pushes the cart 2 forward from the opening of the cart gate 3. At this time, the left-right position of the cart 2 is regulated by the side bars 323 of the cart gate 3 and guided forward. Specifically, the width dimension WC of the cart 2 at the height of the side bars 323 is set to provide a slight gap of about 10 mm between the cart 2 and the side bars 323. Therefore, the relative positions of the cart gate 3 side and the cart 2 side in the width direction are set with high accuracy, and the power transmission device 35 provided on the cart gate 3 and the power reception device 23 provided on the cart 2 can be close to each other. When the leading cart 2 is pushed all the way to the front end portion of the cart gate 3, the position of the wheels 153 of the front wheel casters 151 of the frontmost cart 2 set by the front wheel guides 313 and the front frame 312. The second and subsequent carts 2 behind the frontmost cart 2 will also be specifically positioned in the first direction and the second direction since the carts 2 are designed to stack in a predetermined nested manner with respect to the other carts 2 that are already housed.

According to the cart gate 3 of the first embodiment, power can be efficiently transmitted between the cart gate 3 and the carts 2 with a simple configuration. The interval between side bars 323 arranged at some predetermined height above a traveling surface AA of a cart 2 can be larger than the width dimension of the cart 2 at the same height, and the difference between the interval between the side bars 323 and the width dimension of the cart 2 can be set to be within the power supply range, for example, 20 mm or less. For example, even if there is no rail or floor groove for each wheel 153 of every cart 2 in the cart gate 3, the spacing of the carts 2 can still be defined with high accuracy. Therefore, the distance between the power reception surface 2311 and the power transmission surface 3511 can be kept constant, and power can be efficiently transmitted. Furthermore, since the cart 2 is guided from a position that is close to the handle portion 114 of the cart 2, the cart 2 is easily positioned at the storage location. For example, in a case of a design in which the cart 2 is guided to a storage positions by causing a wheel 153 to be fitted into a lengthy floor groove or between wheel guide rails extending along the floor at the storage location, the user needs to carefully position the wheel 153 by manipulating the handle portion 114, and the alignment process can be difficult. However, with a configuration with cart width guides rather than wheel width guide the positioning using the handle portion 114 is easier.

Also, by equipping the front part of the guide base 31 with the front wheel guide 313, which defines the position of the wheels 153 of the front wheel caster 151 of the leading cart 2, positioning of the cart 2 is possible with a simpler configuration than when a rail or a groove is provided to guide the traveling of the wheels along the traveling direction.

It should be noted that the present disclosure is not limited to the specific embodiment described above, which can be modified in various ways. For example, the shapes and specific configurations of the cart 2 and the cart gate 3 are not limited to those in the above-described embodiment. For example, while a power reception device 23 is disposed on the right side of the cart 2 is illustrated, the power reception device 23 in other examples may be disposed on the left side or both sides. In some examples, the battery box 223 may be disposed below the basket portion 12.

Figure 6:
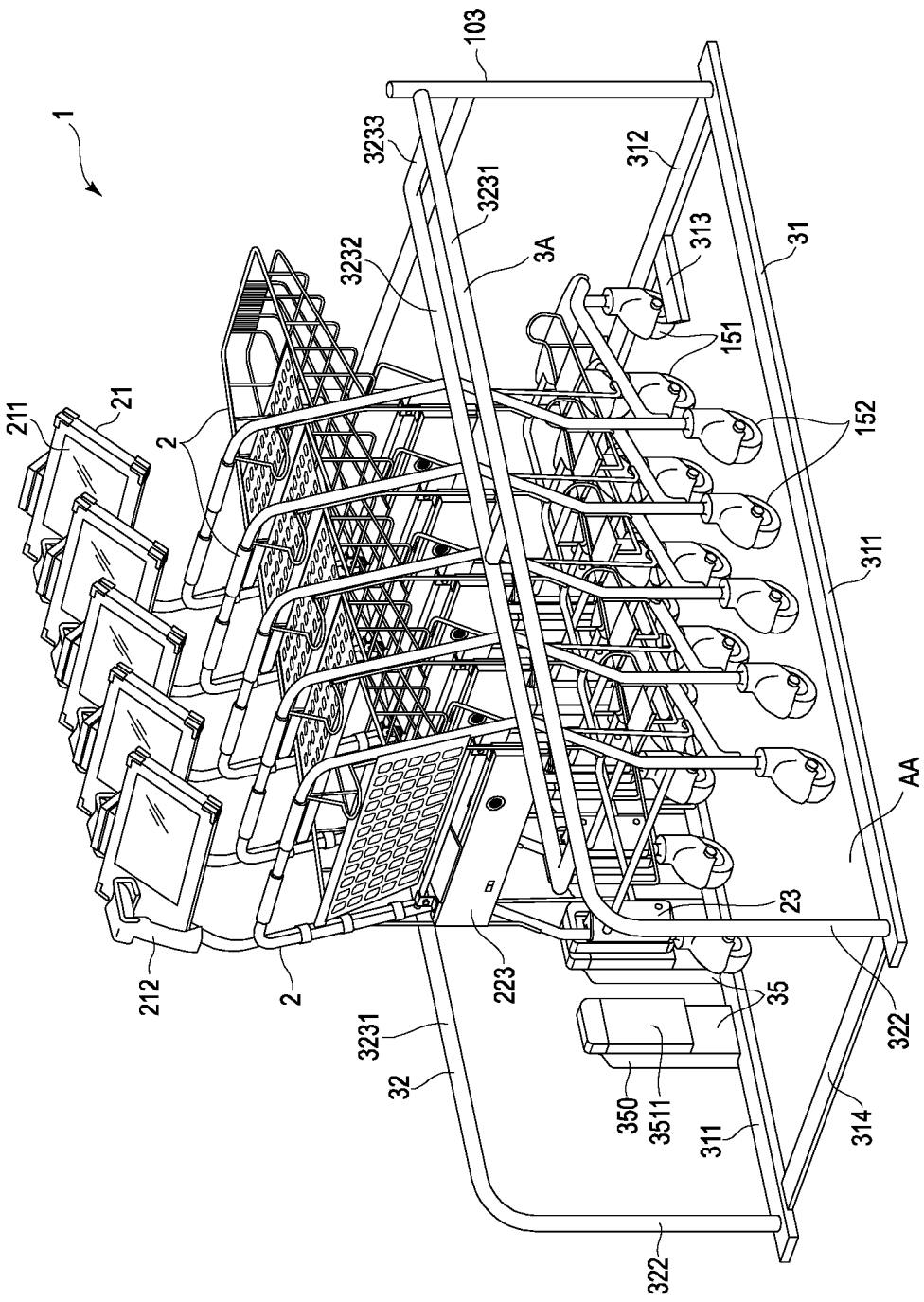
FIG. 6 is a perspective view illustrating a configuration of a power supply system according to another embodiment.
Figure 7:
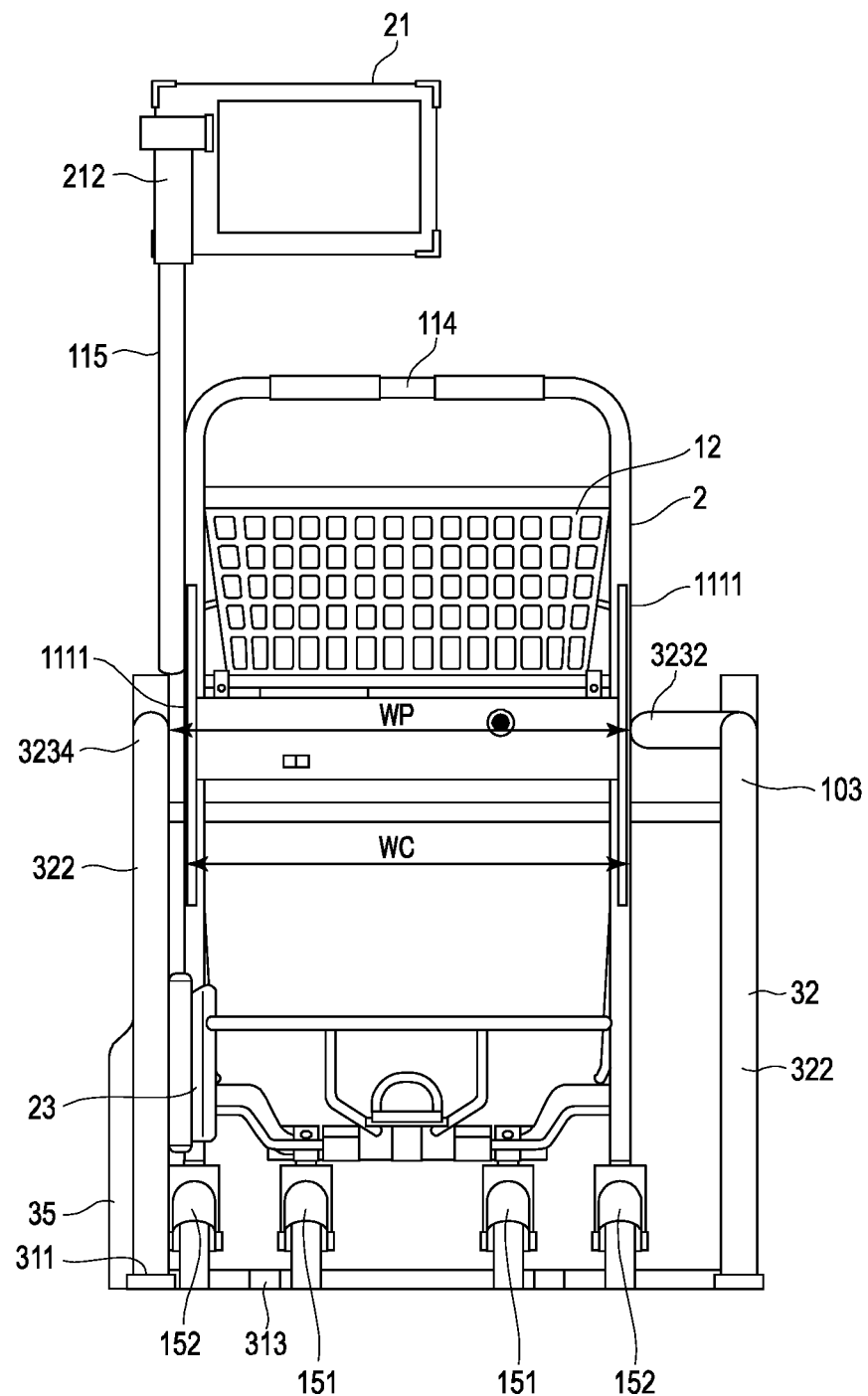
FIG. 7 is a rear view illustrating a configuration of a power supply system according to another embodiment.

In the first embodiment, the side bars 323 serving as a pair of guide members have the two side rods 3231 and 3232, but a side bar 323 may have just the first side rod 3231. For example, the cart gate 103 illustrated in FIGS. 6 and 7 as another embodiment does not include the second side rod 3232 on the side on which the power transmission device 35 is disposed, and the cart 2 faces just the first side rod 3231.

In an embodiment, some power transmission devices 35 are supported on the side frame 311 and some of the power transmission devices 35 are disposed outside the side frame 311. In an embodiment, the interval between a first side rod 3231 and the second side rod 3232 facing each other is the interval between the side bars 323, and is configured to be slightly larger than the width dimension WC of the cart 2.

For example, the difference between the width WC and the interval WP between the side bars 323 is less than or equal to the maximum power range for the power transmission devices, which is, for example, less than or equal to the 20 mm.

Figure 8:
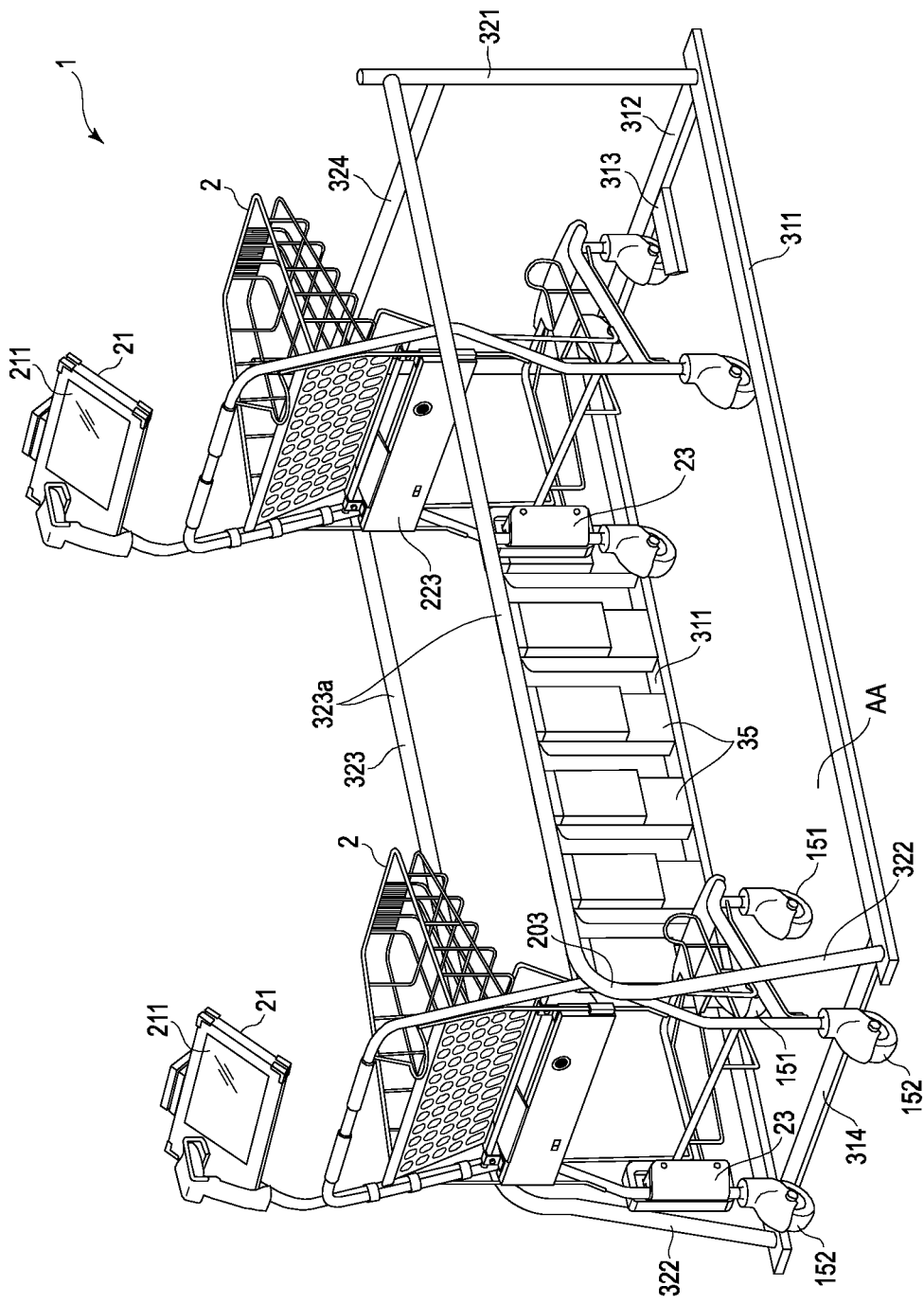
FIG. 8 is a perspective view illustrating a configuration of a power supply system according to another embodiment.
Figure 9:
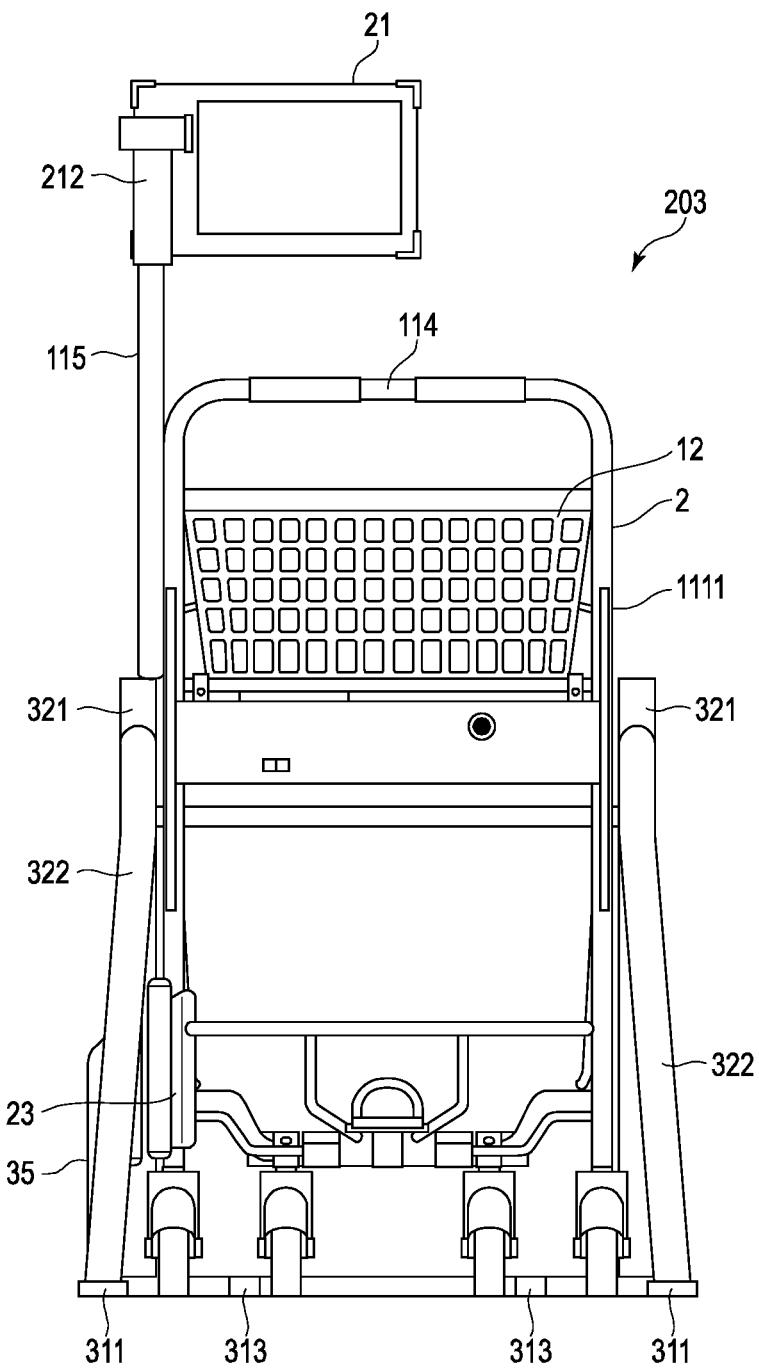
FIG. 9 is a rear view illustrating a configuration of a power supply system according to another embodiment.

In some examples, the side bars 323 on both sides the interval WP may be configured as just the first side rods 3231. For example, a cart gate 203 shown in FIGS. 8 and 9 as another embodiment does not include a second side rod 3232, and the cart 2 is disposed to face the first side rod 3231. The pair of front poles 321 are disposed such that the interval therebetween is narrower than the lower end portion of the rear pole 322, for example, it is extended from the front frame 312 inside the side frame 311. With such a configuration, the casters 151, 152 and the like of the cart 2 do not interfere with the rear pole 322, and the cart 2 can be more easily taken in and out of the cart gate 203.

Each of the pair of rear poles 322 extends upward from the rear end portion of the side frame 311 and is inclined inward so that upward facing distance is narrowed. Therefore, the first side rod 3231 constituting the side bar 323 is disposed to the inside of the side frame 311, and the interval between the first side rods 3231 and the cart 2 is equal to or less than the dimension of the power supply range(for example, 20 mm or less, or preferably 10 mm or less.

The interval between the first side rods 3231 (interval WP in this example) is slightly larger than the width dimension WC of the cart 2. For example, the difference between the width dimension WC and the interval WP is the maximum power supply range or less, for example, 20 mm or less.

Figure 10:
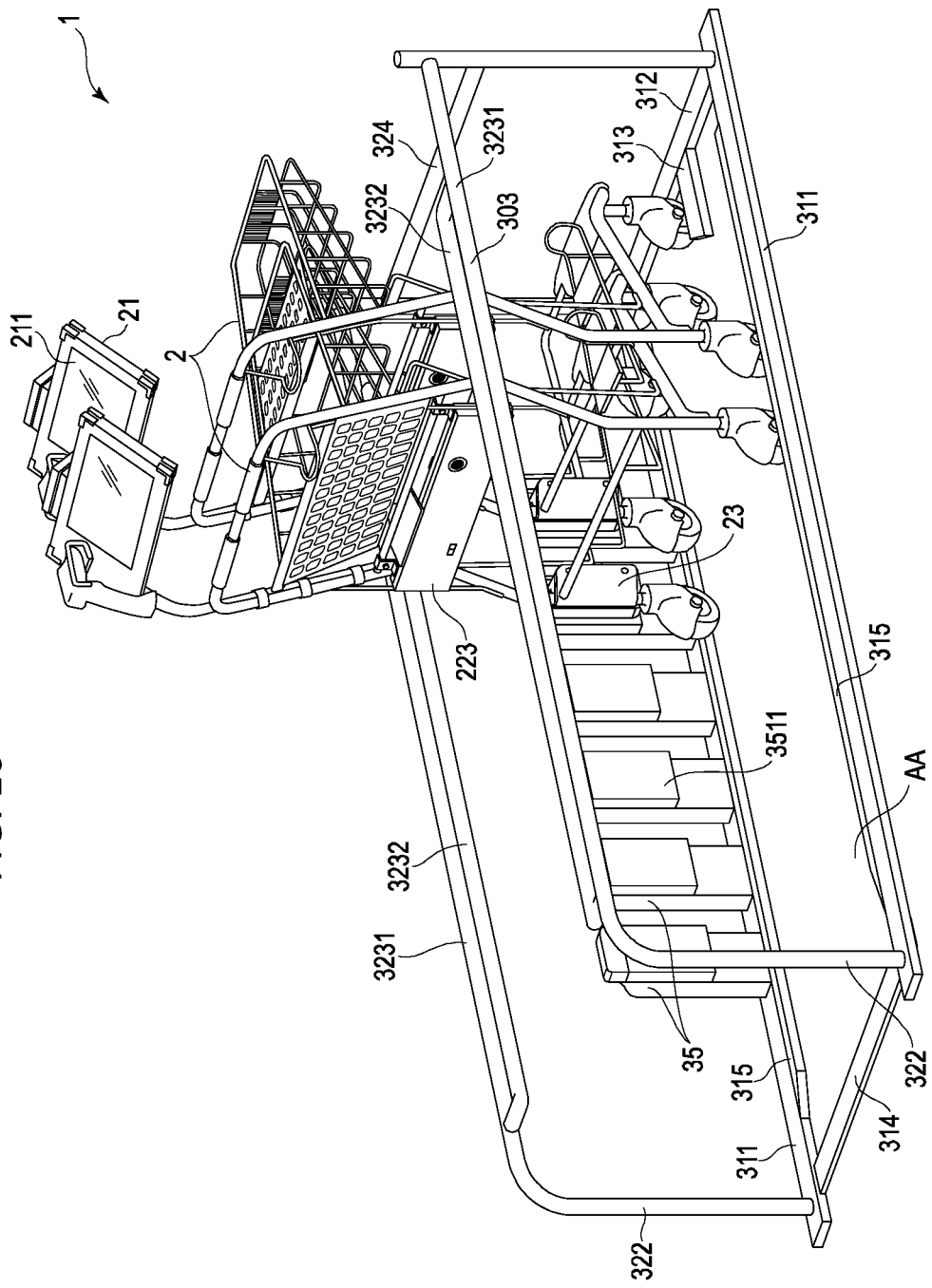
FIG. 10 is a perspective view illustrating a configuration of a power supply system according to another embodiment.

As another embodiment, a positioning member for the wheel 153 of a rear wheel caster 152 may be provided as depicted in FIG. 10 for a cart gate 303. In the cart gate 303, a plurality of power transmission devices 35 are disposed on the side frame 311. The cart gate 303 has a narrower width dimension than a configuration in which the power transmission devices 35 are disposed to the inside of a side frame 11. The cart gate 303 has a narrow interval between the first side rod 3231 and the second side rod 3232. In the cart gate 303, a guide rail 315 for regulating the outer position of the wheel 153 of a rear wheel caster 152 is provided inside the side frame 311. The guide rail 315 is, for example, a frame member whose inner edge is angled so as to widen the space serving as an entrance. The guide rail 315 is formed to extend from the vicinity of the front pole 321 towards the rear pole 322. The cart gate 303 according to this embodiment can be configured to have a narrow width, and can thus stabilize the posture of the carts 2 by guiding the wheels 153 of the rear wheel casters 152 using a guide rail 315 or a pair of guide rails 315.

Figure 11:
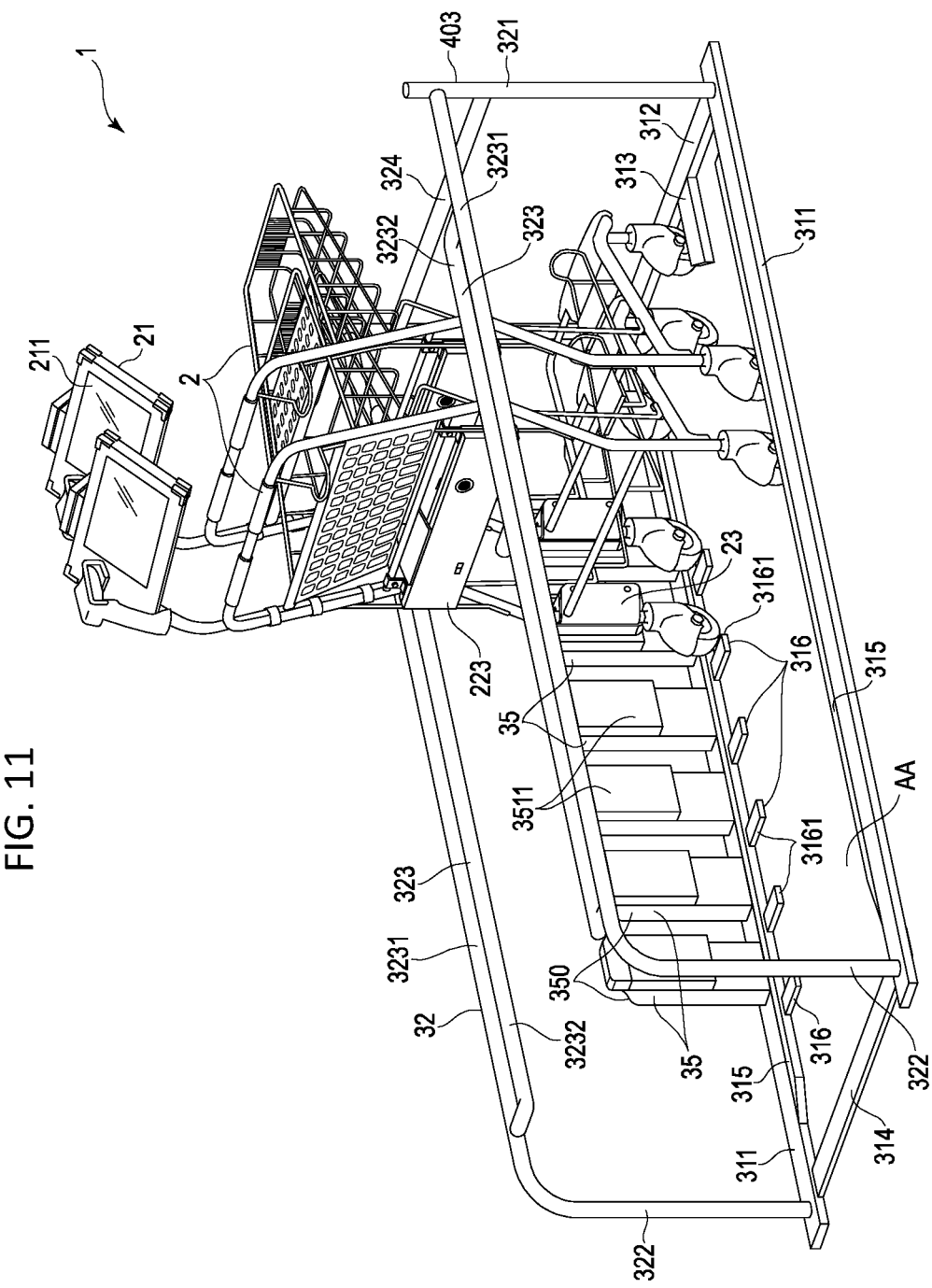
FIG. 11 is a rear view illustrating a configuration of a power supply system according to another embodiment.
Figure 12:
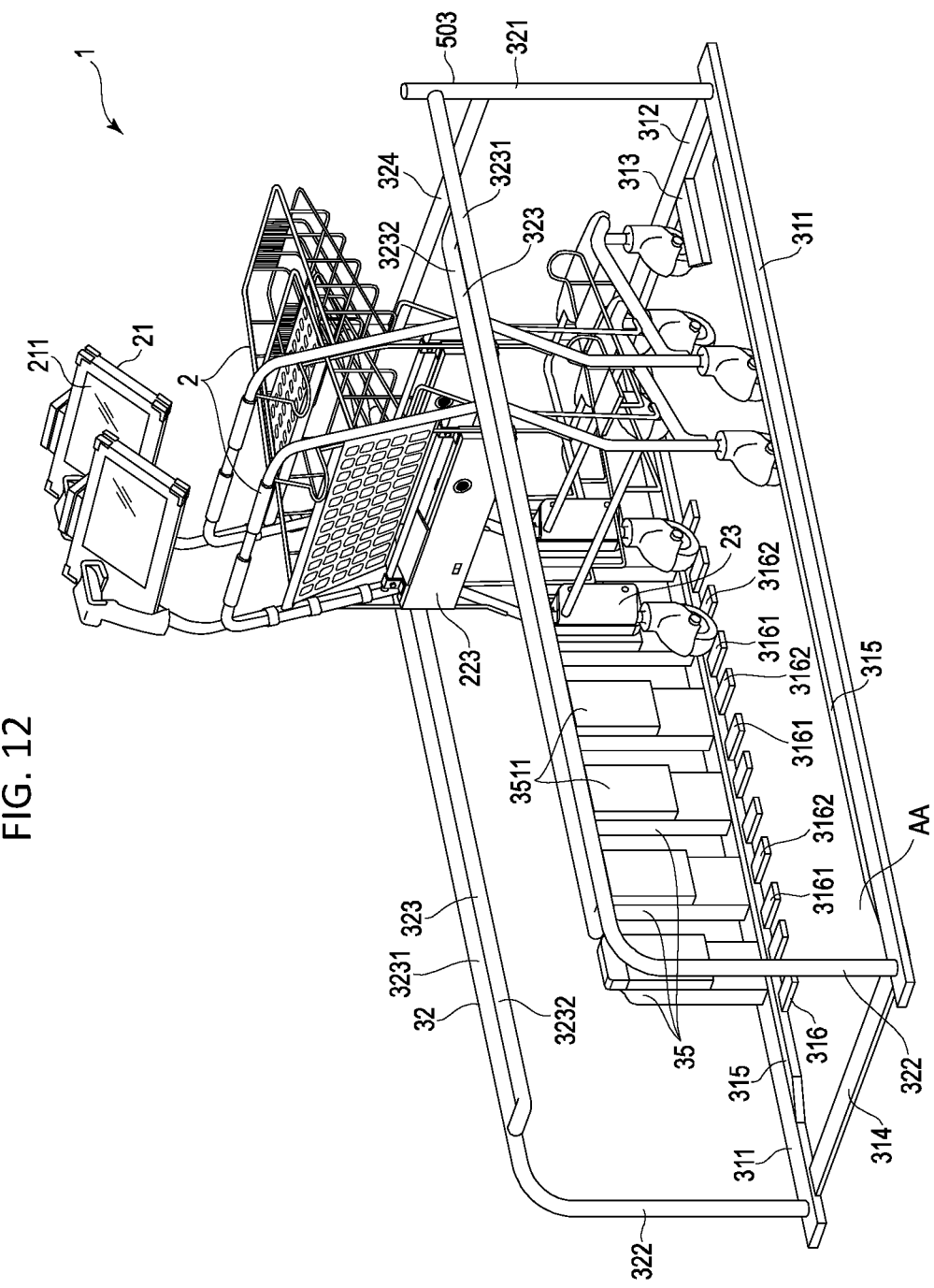
FIG. 12 is a perspective view illustrating a configuration of a power supply system according to another embodiment.

Furthermore, a rear wheel guide may also be provided to restrict the position of the rear wheels in the first direction. For example, in a cart gate 403 shown in FIG. 11, a plurality of regulation rails 316 serving as rear wheel guides for regulating the arrangement positions of carts 2 are provided to the inside of the side frames 311. Each regulation rail 316 may be a regulation rail 3161 or a regulation rail 3162 (see FIG. 12). A regulation rail 3161 is behind a wheel 153 of the rear wheel caster 152, as shown in the cart gate 403 in FIG. 11, or a regulation rail 3162 in front of a wheel 153 of the rear wheel caster 152, as shown in cart gate 503 in FIG. 12. As depicted in FIG. 12, both regulation rails 3161 and regulation rails 3162 may be provided.

The regulation rails 3161 and regulation rails 3162 can have lengths equivalent to the positions of the wheels 153 of the rear wheel casters 152, and can be arranged at predetermined intervals along the first direction on the inner side of a side frame 311.

Figure 13:
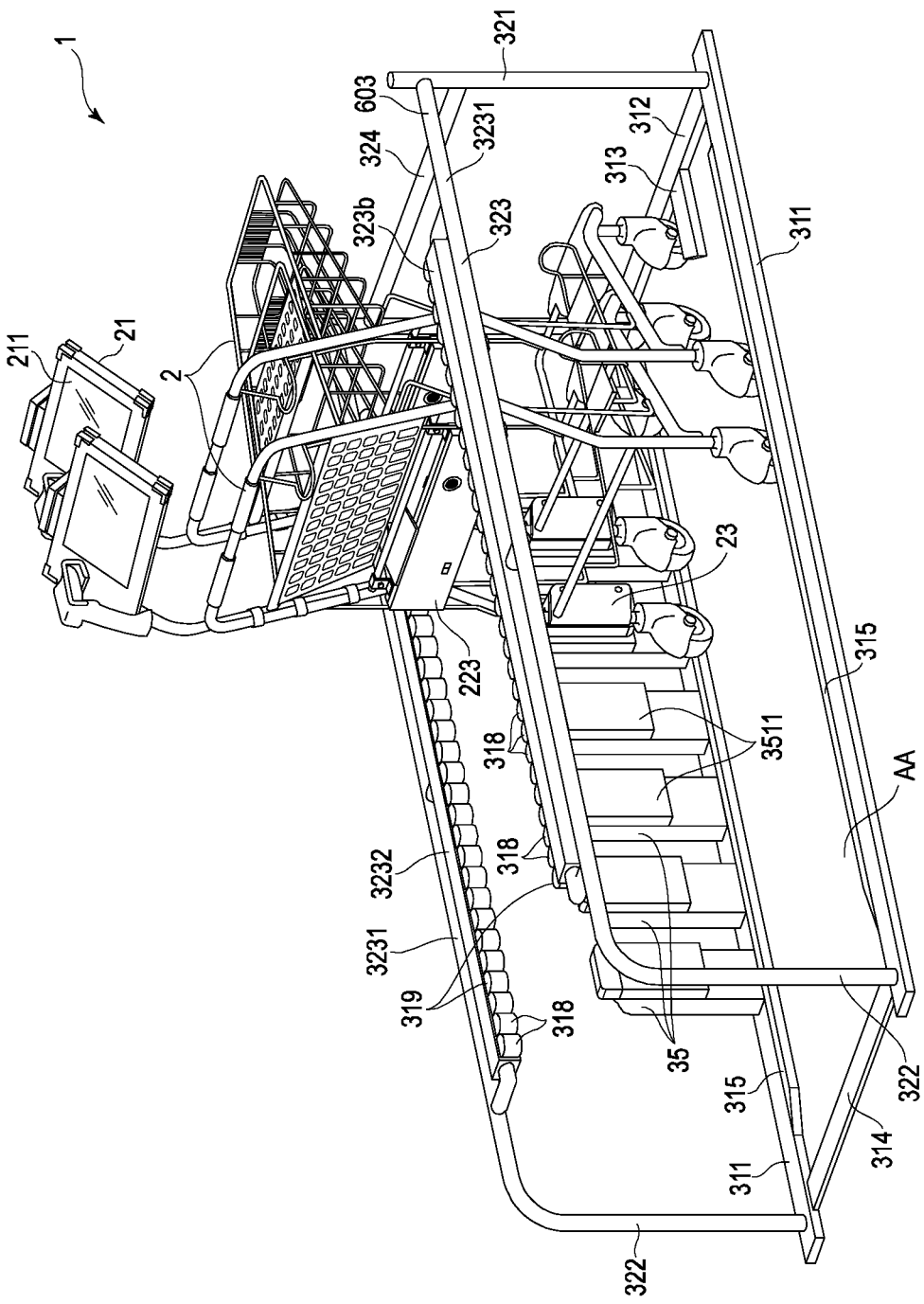
FIG. 13 is a rear view illustrating a configuration of a power supply system according to another embodiment.

In another example, an assisting member that reduces the frictional force and helps guide the cart 2 in the traveling direction may be provided on the inner side of the side bar 323 facing the cart 2. For example, in a cart gate 603 shown in FIG. 13, a roller row 319 in which a plurality of rotatable rollers 318 are arranged is provided as an assist member. Specifically, the side bar 323 includes a first side rod 3231 disposed on the outer side and a second side rod 3232 disposed on the inner side, and a plurality of rollers 318 are provided on the inner side of the second side rod 3232. The roller row 319 includes rollers 318 provided so as to be rotatable about an axis extending vertically. The second side rod 3232 guides the cart 2 in the traveling direction with the roller 318 . In cart gate 603, the interval between the rollers 318 is slightly larger than the width dimension WC.

The various rods and poles in the embodiments are not limited to a cylindrical shape, but may instead be a prism shape or a plate shape.

According to a cart gate of at least one embodiment, power can be efficiently transmitted with a simple configuration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage rack for shopping carts with rechargeable batteries, the storage rack comprising:
    a first guide rail extending in a first direction;
    a second guide rail extending in the first direction and spaced from the first guide rail in a second direction perpendicular to the first direction; and
    a power transmission device mounted on the first guide rail, the power transmission device configured to provide power, in a non-contact manner, to a power reception device on a shopping cart that is between the first and second guide rails at a predetermined cart storage position along the first direction, wherein
    the first guide rail comprises:
        a first base portion extending in the first direction along a floor surface,
        a first vertical portion extending in a third direction orthogonal to the first and second directions from a first end portion of the first base portion,
        a second vertical portion extending in the third direction from a second end portion of the first base portion, the second end portion being spaced from the first end portion in the first direction,
        a first side portion extending from the first vertical portion to the second vertical portion, and
        a first side rod connected to the first side portion but spaced in the second direction from a central portion of the first side portion between ends of the first side portion,
    the minimum distance from the first side rod to the second guide rail in the second direction is greater than a width of the shopping cart, and the difference between the minimum distance and the width of the shopping cart is less than or equal to a maximum power transmitting range of the power transmission device.

2. The storage rack according to claim 1, wherein the second guide rail comprises:
   a second base portion extending in the first direction along the floor surface,
   a third vertical portion extending in the third direction from a first end portion of the second base portion,
   a fourth vertical portion extending in the third direction from a second end portion of the second base portion, the second end portion of the second base portion being spaced from the first end portion of the second base portion in the first direction,
   a second side portion extending from the third vertical portion to the fourth vertical portion, and
   a second side rod connected to the second side portion but spaced in the second direction from a central portion of the second side portion between ends of the second side portion.

3. The storage rack according to claim 2, wherein the first side rod and the second side rod are at the same height in the third direction.

4. The storage rack according to claim 1, wherein the minimum distance between the first base portion and the second guide rail is greater than the minimum distance between the first side rod and the second guide rail.

5. The storage rack according to claim 1, wherein the power transmission device is connected to the first base portion and is at a position closer to the second guide rail than is the first base portion.

6. The storage rack according to claim 1, wherein the first vertical portion extends from the first base portion at an angle towards the second guide rail.

7. The storage rack according to claim 1, further comprising:
   a horizontal member extending in the second direction from the first guide rail to the second guide rail; and
   a front wheel guide extending from the horizontal member in the first direction and configured to position a front wheel of the shopping cart at a predetermined location in the second direction.

8. The storage rack according to claim 1, further comprising:
   a rear wheel guide extending from the first base portion in the second direction and configured to position a rear wheel of the shopping cart at a predetermined position along the first direction corresponding to the predetermined cart storage position.

9. A rechargeable cart system, comprising:
   a cart including a rechargeable battery and a non-contact power reception device configured to supply power to the rechargeable battery; and
   a cart storage rack including:
      a first guide rail extending in a first direction;
      a second guide rail extending in the first direction and spaced from the first guide rail in a second direction perpendicular to the first direction; and
      a power transmission device mounted on the first guide rail, the power transmission device configured to provide power to the non-contact power reception device on the cart between the first and second guide rails when the cart is at a predetermined cart storage position along the first direction, wherein
   the first guide rail comprises:
      a first base portion extending in the first direction along a floor surface, a first vertical portion extending in a third direction orthogonal to the first and second directions from a first end portion of the first base portion,
      a second vertical portion extending in the third direction from a second end portion of the first base portion, the second end portion being spaced from the first end portion in the first direction,
      a first side portion extending from the first vertical portion to the second vertical portion, and
      a first side rod connected to the first side portion but spaced in the second direction from a central portion of the first side portion between ends of the first side portion,
   the minimum distance from the first side rod to the second guide rail in the second direction is greater than a width of the cart, and
   the difference between the minimum distance and the width of the cart is less than or equal to a maximum power transmitting range of the power transmission device.

10. The rechargeable cart system according to claim 9, wherein the cart is a shopping cart.

* * * * *